United States Patent [19]

Patzschke et al.

[11] Patent Number: 4,857,580

[45] Date of Patent: Aug. 15, 1989

[54] CROSSLINKED COATING RESIN

[75] Inventors: Hans-Peter Patzschke; Peter W. Cerny; Armin Goebel; Karlheinz Stransky, all of Wuppertal, Fed. Rep. of Germany

[73] Assignee: Herberts Gesellschaft mit beschraenkter Haftung, Wuppertal, Fed. Rep. of Germany

[21] Appl. No.: 219,863

[22] Filed: Jul. 12, 1988

Related U.S. Application Data

[63] Continuation of Ser. No. 783,832, Oct. 3, 1985, abandoned.

[30] Foreign Application Priority Data

Oct. 4, 1984 [DE] Fed. Rep. of Germany ....... 3436346

[51] Int. Cl.$^4$ ................................................. C08F 8/32
[52] U.S. Cl. ....................................... 524/507; 524/513; 524/548; 525/124; 525/327.3; 525/379; 525/380
[58] Field of Search ................. 524/507, 513, 548; 525/327.3, 124

[56] References Cited

U.S. PATENT DOCUMENTS

| | | | |
|---|---|---|---|
| 2,630,429 | 3/1953 | Hwa | 525/327.3 |
| 2,676,166 | 4/1954 | Webers | 525/327.3 |
| 4,037,018 | 7/1977 | McGinniss | 525/327.3 |
| 4,166,079 | 8/1979 | Tatsukami et al. | 525/327.3 |
| 4,273,661 | 10/1981 | Probst et al. | 525/327.3 |

FOREIGN PATENT DOCUMENTS

| | | |
|---|---|---|
| 602986 | 8/1960 | Canada . |
| 12463 | 6/1980 | European Pat. Off. . |
| 944964 | 12/1963 | United Kingdom . |

*Primary Examiner*—Joseph L. Schofer
*Assistant Examiner*—Bernard Lipman
*Attorney, Agent, or Firm*—Schweitzer & Cornman

[57] ABSTRACT

An externally crosslinkable aminopoly(meth)acrylate resin free from epoxy groups for water-dilutable lacquers having an amine number of from 30 to 150 and a hydroxyl number of from 30 to 450, obtainable by reacting a poly(meth)acrylate resin containing epoxy groups and having an average molecular weight ($\overline{M}n$) of from 600 to 10,000 and an epoxy equivalent weight of from 300 to 4000 with an excess of primary and/or secondary monoamines and/or amionoalcohols to react all the free epoxy groups with the amine groups and distilling off the unreacted excess amine compound, a process for its production and its use. The invention also relates to a CED bath which contains these aminopoly(meth)acrylate resins and crosslinking agents and, optionally, hydroxyfunctional resins and to its use for coating objects.

3 Claims, No Drawings

CROSSLINKED COATING RESIN

This is a continuing application of U.S. Ser. No. 783,832, filed on Oct. 3, 1985, now abandoned.

BACKGROUND OF THE INVENTION

This invention relates to an externally crosslinkable aminopoly(meth)acrylate resin free from epxoy groups for water-dilutable lacquers having an amine number of from 30 to 150 and a hydroxyl number of from 30 to 450. The invention also relates to a process for its production and to the use of the resin as a binder for CED lacquers. In addition, the invention relates to CED baths containing this binder and to their use for coating objects having an electrically conductive surface.

In addition to the externally crosslinkable aminopoly(meth)acrylate resins, these CED baths additionally contain crosslinking agents, such as formaldehyde condensates, blocked polyisocyanates and/or resins containing transesterifiable ester groups and, optionally, hydroxyfunctional resins.

It is known that basic organic binder systems dispersed by salt formation in an aqueous medium may be coagulated on a conductive metallic object immersed in an aqueous bath (ED bath) in an electrical field at the cathode. The corrosion-inhibiting primers normally used for this purpose in practice are aminoepoxy resin systems produced by reaction of epoxy resins based on bisphenol A with various amines and/or aminoalcohols. The deposited film is crosslinked by addition of crosslinking components which do not have to be dilutable with water, but which instead are emulsified with the base resin into the lacquer and at the same time coagulated. The thermal crosslinking of the film is carried out by two basically different methods, for example by addition of blocked isocyanates (DE-A-20 57 799, DE-A-21 31 060, DE-A-22 52 536, DE-A-22 65 195, DE-A-26 34 211) or transesterifiable crosslinking agents (EP-A-0 004 090, EP-A-0 012 463, EP-A-0 040 867, EP-A-B 0 066 859, EP-A-0 082 291, DE-A-31 03 642, DE-A-32 15 891, DE-A-32 24 864, DE-A-32 25 874, DE-A-33 15 469, DE-A-33 22 766). State-of-the-art CED baths are generally used solely for applying primers because the qualities used, based on aminoepoxy resin, yellow on stoving and chalk in long-term weathering. Accordingly, the lacquers cannot be pigmented in such a way that they are suitable as surface lacquers. In addition, in primer/surface coat lacquering, stoving of the surface lacquer, where it is carried out at a higher temperature than is necessary for priming, is sometimes likely to produce cloud-like changes in the color of the surface lacquer through cracking products emanating from the primer, thus spoiling the final appearance of the surface coating. These disadvantages were said to be overcome by using a poly(meth)acrylate resin system containing amino groups.

However, any attempt to use the aminopolyacrylates disclosed in various patents encounters certain disadvantages in regard to the properties of the coatings obtained. According to DE-A-15 46 854, acrylic copolymers containing OH groups are produced using from 3 to 30% by weight of at least one ethylenically unsaturated amino compound, for example the dialkylaminoalkyl(meth)acrylate, dialkylamino(meth)acrylamide or 5- to 6-membered N-vinyl heterocycles and are deposited in combination with formaldehyde condensation resins. In this process, the ED baths are in general highly acidified because the crosslinking reaction with melamine resins is acid-catalyzed. This gives rise to the disadvantage that iron components of tanks, pipes and pumps are attacked and the film ends up with a yellow, often cloud-like discoloration through the iron ions.

According to DE-A-20 57 799, copolymers containing amino groups are produced by copolymerization of amine-containing esters of monofunctional or difunctional unsaturated acids, such as tert.-butylaminoethylmethacrylate or dimethylaminoethylmethacrylate, or vinyl-containing heterocyclic compounds, such as N-vinylpiperidine and, after combination with blocked polyisocyanates, are crosslinked during stoving. Poly(meth)acrylate resins having this chemical structure give rise to difficulties during the electrophoretic deposition of uniform coatings. Even with 100% neutralization, they still show a tendency towards precipitation and give acidic pH values. The blocking agents mentioned are so stable that they are only split off at relatively high temperatures. The products formed in large quantities their removal lead to excessive losses which, as in the case of the phenol used in the Examples, can be harmful to the environment.

According to DE-A-15 95 501, monoethylenically unsaturated monomers containing an epoxy group are copolymerized by emulsion polymerization. These oxirane rings are reacted with amines before, during or after the polymerization. On page 3, middle, it is stated that solution polymerization gives copolymers of, in general, lower molecular weight of which the polymeric particles cannot be stably suspended.

According to DE-A-23 25 177, secondary amines and, with particular advantage, alkanolamines (page 5) because they ensure good dispersibility, are used in a quantity of from 0.1 to 1.0 equivalent per equivalent of epoxy group. If these amines are used in quantities of more than 1.0 equivalent, unreacted amine remains behind and adversely affects the resistance to water and other properties of the hardened coating (page 6).

According to DE-A-28 01 523, epoxy-group-containing copolymers containing from 40 to 90% by weight of unsaturated diene monomers are produced. The epoxy groups are reacted with amine; "in some cases", virtually all the epoxy groups are reacted with amine, although in general excess epoxy groups remain in the resin (bottom of page 4 to top of page 5). Accordingly, the disavantage of epoxy groups remaining in the resin, namely that there is an increase in the viscosity of the resins during storage which can lead to useless products, is accepted in this case, too. Apart from this, these resins tend to yellow after stoving on account of the incorporation of diene monomers.

All the basic copolymers produced in accordance with these patents frequently give rise to stability problems, as reflected in pronounced tendencies towards thickening and gelation, particularly where strongly basic dialkylamines are incorporated, and in precipitation phenomena which appear during ageing of the ED baths or in the surface of the deposited film which presents difficulties because of its irregular thickness distribution or because of its pronounced tendency towards rupture.

SUMMARY OF THE INVENTION

The object of the present invention is to provide non-yellowing binders which are depositable at the cathode, dilutable with water at a pH value above 5.0, crosslink externally and produce a satisfactory surface, even in the event of prolonged use of the tank.

It has surprisingly been found that stable aminopoly(meth)acrylates readily dilutable with water, even at relatively high pH values, can be obtained by reacting epoxy-group-containing (meth)acrylic copolymers produced by solution polymerization with excess, primary and/or secondary monoamines and/or aminoalcohols and then suitably distilling off the excess amine. The film containing hydroxyl groups is crosslinked by addition of crosslinking agents, such as amine-formaldehyde resins, blocked polyisocyanates and/or resins containing transesterifiable ester groups in the presence of suitable catalysts.

Accordingly, the present invention relates to the externally crosslinkable aminopoly(meth)acrylate resin free from epoxy groups, to the process for its production, to its use as a binder in electrodeposition baths (ED baths), to ED baths containing this binder, to the process for coating substrates in these ED baths and to the substrates thus coated and hardened, as defined in the claims.

DETAILED DESCRIPTION OF THE INVENTION

According to the invention, the poly(meth)acrylate resins containing epoxy groups which are known and commonly used in this field are used as starting products. These resins contain as their principal component copolymerized monoethylenically unsaturated monomers containing epoxy groups. They generally make up from 8 to 50% by weight of the copolymer, the lower limit being at around 12% by weight and the upper limit at around 35% by weight, as is also the case with the prior art. Unsaturated monomers containing epoxy groups are mono- and/or diglycidyl compounds of unsaturated acids, acid amides or alcohols, such as for example glycidyl esters of (meth)acrylic acid, fumaric acid or maleic acid monoalkylesters, glycidyl compounds of (meth)acrylic acid amide, fumaric acid diamide or maleic imide and/or glycidyl ethers of vinyl alcohol or allyl alcohol. Other suitable compounds are monoglycidyl esters of dicarboxylic acid monoesters with unsaturated alcohols, such as phthalic acid allyl glycidyl ester, or monoglycidyl ethers of hydroxyalkyl(meth)acrylic acid esters. However, vinyl or allyl esters of epoxidized unsaturated fatty acids, such as 2,3-epoxy butyric acid allylester of epoxy stearic acid allylester, may also be used. Diolefins of which one double bond has been epoxidized, such as vinylethylene oxide, 1-methyl-1-vinylethylene oxide or 3,4-epoxy-1-vinylcyclohexane, are also suitable. Glycidylacrylate and glycidylmethacrylate are preferably used for the copolymerization.

To adjust the mechanical and crosslinking properties of the deposited film from 92 to 50% by weight of the remaining ethylenically unsaturated monomers or monomer mixtures are selected from the following groups and copolymerized:

1. Acrylic acid alkylesters, methacrylic acid alkylesters and/or maleic acid dialkylesters, the alkyl groups containing from 1 to 20 carbon atoms and being arranged in a linear or branched aliphatic chain and/or as a cycloaliphatic and/or (alkyl)aromatic radical. These compounds include, for example, n-butylacrylate, tert.-butylacrylate, 2-ethylhexylacrylate, methylmethacrylate, isopropylmethacrylate and/or cyclohexylacrylate. Unsaturated ethers, such as ethoxyethylmethacrylate or tetrahydrofurfurylacrylate may also be used. The copolymerizable monomers also include vinyl esters of $C_2-C_{20}$ alkane carboxylic acids, such as the vinyl esters of Versatic acid(®).

2. (Alkyl)vinylbenzenes, such as styrene, α-substituted styrenes, such as α-methylstyrene, o-, m- and p-alkylstyrenes, such as vinyltoluene or p-tert.-butylstyrene, and/or halogenated (alkyl)vinylbenzenes, such as o- and/or p-chlorostyrene.

3. Copolymerizable monomers containing hydroxyl groups are those which, in addition to an ethylenically unsaturated copolymerizable group, also contain at least one hydroxyl group on a $C_2-C_{20}$ carbon chain. These compounds include allylalcohol, monovinylethers of polyols, especially diols, such as monovinylethers of ethylene glycol and butane diol, and also hydroxyl-group-containing allyl ethers or esters, such as 2,3-dihydroxypropylallylether, trimethylolpropane monoallylether or 2,3-dihydroxypropanoic acid allylester. Particularly suitable compounds of the type in question are acrylic acid hydroxyalkylester, methacrylic acid hydroxyalkylester of fumaric acid dihydroxyalkylester, of which the linear, branched or cyclic alkyl group contains from 2 to 20 carbon atoms, such as β-hydroxypropylmethacrylate, hydroxyethylacrylate, 1,4-butane diol monoacrylate, 2,3-dihydroxypropylacrylate, pentaerythritol monomethacrylate, polypropylene glycol monoacrylate or polypropylene glycol monomethacrylate of varying molecular weight and also hydroxyalkylacrylamide, hydroxyalkylmethacrylamide or hydroxyalkyl fumaric acid diamide, such as hydroxyethylacrylamide or 2-hydroxypropylmethacrylamide. Particularly elastic properties can be obtained where a reaction product of hydroxyalkyl(meth)acrylate with ε-caprolactone is used. Unsaturated monomers containing primary hydroxyl groups are preferred by virtue of their higher reactivity for transesterification reactions. Hydroxyethyl(meth)acrylatesare particularly suitable.

The copolymerization is carried out in known manner by solution, suspension or emulsion polymerization in the presence of radical initiators, such as peroxides, hydroperoxides, peresters or thermally unstable azo compounds, and optionally in the presence of molecular weight regulators. Solution polymerization in organic solvents or solvent mixtures dilutable with water is preferred. Solvents of this type are, for example, ethylene glycol, ethylene glycol monoethylether, ethylene glycol monobutylether, diethylene glycol, triethylene glycol, diethylene glycol dimethylether, propylene glycol, propylene glycolmonomethylether, dipropylene glycol monomethylether, diacetone alcohol, ethanol, isopropanol, sec.-butanol, tert.-butanol, acetone, dioxane and/or tetrahydrofuran. The polymerization temperature depends on the boiling point of the solvent and on the decomposition temperature of the initiator and is in the range from 60° to 160° C. Polymerization must be complete because otherwise reversible secondary reactions of the activated double bond of the monomers with the secondary amines occur.

The monomers and the polymerization process are so selected that the copolymer has an epoxy equivalent weight of from 300 to 4000 for an average molecular weight ($\overline{M}n$) of from 600 to 10,000. Particularly suitable copolymers have K-values (after Fikentscher, Cellulosechemie 13 (1932), pages 12 to 25) of from 10 to 50. These molecular weights correspond to viscosities of from about 0.3 Pas after dilution with ethylene glycol monoethers to 60% by weight at 25° C. to 8.0 Pas after dilution to 50% by weight. The suitable average molecular weights of suitable viscosities may also be obtained by mixing resins of relatively high viscosity or molecular weight with resins of relatively low viscosity or molecular weight.

The number of epoxy groups determines the number of amino groups reacting therewith and, hence, the solubility of the product. There should be at least one epoxy group per molecule.

The number of primary and/or secondary hydroxyl groups corresponds to a hydroxyl number of from 30 to 450 mg KOH/g solid resin and is optimized so that an effectively cross-linking, solvent-resistant film is formed during stoving of the lacquer. If it is considered that, during the reaction with amine, one secondary OH group is formed from each epoxy group, it is advisable to copolymerize at least one other hydroxyl group, preferably a primary hydroxyl group, per molecule.

The monomers which do not contain any other reactive functional groups are chosen according to economic aspects and according to the glass transition temperature (Tg) of the copolymer which is between $-20°$ and $+50°$ C. and which influences the hardness-elasticity properties. The copolymers may optionally contain a small quantity of acrylamide, methacrylamide, maleic acid amide, maleic acid imide or the corresponding methylol or methylolether compounds.

However, all this is state-of-the-art and, as already mentioned, the poly(meth)acrylate resins normally used in this field are employed as starting products in accordance with the invention, although they do not contain co-condensed diene compounds as monomers because compounds such as these promote yellowing of the stoved lacquers.

According to the invention, these poly(meth)acrylate resins are reacted with an excess of primary and/or secondary monoamines and/or aminoalcohols to react all the free epoxy groups and the unreacted amino compounds used in excess are subsequently distilled off. The amines or aminoalcohols contain one amino group per molecule. The reaction is best carried out at temperatures of from about 40° to 200° C. and more especially at temperatures of from 60° to 120° C. under normal pressure. If the desired reaction temperature is above the boiling point of the amine, the reaction may even be carried out under pressure, more especially under a pressure of up to about 10 bar. If the reaction is carried out below 40° C., its velocity is often so low, depending on the epoxy-group-containing resin, that the reaction takes a relatively long time to complete. If the reaction temperature is too high, the base-catalyzed polyetherification of the unreacted epoxy groups takes place to a greater extent as a secondary reaction. The reaction time is best between about 1 and 5 hours. To complete the reaction, it is often of advantage to start at a relatively low temperature and to finish at a relatively high temperature. By addition of acid hydrogen atoms to the ether oxygen, the positive partial charge of the oxirane ring is increased, making the oxirane ring more readily accessible to nucleophilic addition of the amine. Thus, the reaction is often accelerated by addition of water, alcohol, phenol, acid or acidic metal salts. In general, however, the reaction of epoxy groups, particularly glycidyl ether or glycidyl ester groups, with amines does not have to be catalyzed.

The essential feature of the invention is that the amine is used in excess. A reaction product having no tendency towards gelation is suprisingly obtained in this way. In order to achieve a complete reaction of all the epoxy groups, a quantity of more than 1.01 equivalent of amino groups to 1 equivalent of epoxy groups is sufficient, particularly when the reaction is carried out over prolonged periods at relatively high temperatures. However, it is preferred to use a somewhat larger excess of amino groups, i.e. more than 1.04 equivalent and, better still, more than 1.06 equivalent of amine to 1 equivalent of epoxy groups. The reaction is best carried out either by slowly introducing the heated epoxy resin solution into the amine or by quickly introducing the amine into a sealed vessel containing the thoroughly stirred epoxy resin solution at room temperature. The production process and the rate at which the amine is added influence the polyetherification taking place as a secondary reaction and hence the viscosity of the resin. The upper limit to the amine excess is preferably at about 1.5, more preferably at about 1.2 and most preferably at about 1.15 equivalents of amine. For economic reasons, the amine excess should be kept as small as possible.

The amine excess has to be completely removed. Accordingly, the amines used (including aminoalcohols) are those which may be distilled off under conditions (pressure, temperature, time) which do not bring about any undesirable change in the resin. Distillation is carried out under normal pressure or under reduced pressure, particularly using a thin-layer evaporator. In another preferred process, the amines are distilled off with steam. The steam provides for particularly intensive mixing of the resin and facilitates removal of the excess resin by distillation. If the resin is kept at a temperature of from about 100° to 110° C. under normal pressure, condensed water is prevented from accumulating in the flask. This steam distillation step may be carried out either with saturated or with superheated steam at reduced temperatures. It is over when no more amine can be detected in the water which has distilled over. Where this process is used, compatibility of the solvent, which is used in the copolymerization as described above, and the amine is particularly important. Thus, the amine must boil at a lower temperature or must be more volatile to steam than the solvent. The following amines for example may be used for the reaction: $C_1$–$C_6$ dialkylamines containing the same or different alkyl groups in the molcule, such as dimethyl, diethyl, diisopropyl, dibutylamine, methylethyl, methylpropyl, methylbutylamine, monocycloaliphatic amines, such as morpholine, piperidine pyrrolidine, and/or monoalkanolamines, such as N-methylaminoethanol, and/or dialkanolamines, such as diethanolamine, diisopropanolamine. Examples of primary amines or aminoalcohols are $C_1$–$C_6$ alkylamines, such as ethylamine or aminoethanol. In either case, $C_1$–$C_4$ alkyl groups are preferred, $C_1$ and/or $C_2$ alkyl groups being particularly preferred. The secondary amines mentioned above are particularly preferred and may optionally be used in admixture with the primary amines mentioned above. Secondary amines reduce the tendency towards products of relatively high viscosity. The reaction with excess lower dialkylamines, such as dimethylamine or diethylamine, is particularly advantageous because, by virtue of their low basicity, these low-boiling amines provide for good solubility and for a high pH value in the ED bath. However, since strongly basic amines catalyze the reaction of epoxy groups with one another, undesirable polymerization with an increase in viscosity and the danger of gelation might have been expected to occur, as will be shown hereinafter by the Comparison Examples. Surprisingly, however, this is not the case according to the invention. The amine number is between 30 and 150 and preferably between 45 and 100 (mg KOH/g solid resin).

The externally crosslinkable aminopoly(meth)acrylate resins according to the invention as described in the foregoing are used as binders for cathodic electrodeposition in ED baths (CED baths). However, they may also be used as binders in lacquers which are applied to substrates by other standard methods, such as spraying, immersion, etc.

The CED baths contain the aminopoly(meth)acrylate resins according to the invention, hereinafter referred to in this connection as component (A) together with crosslinking agents hereinafter referred to as component (B) and standard additives, as described in detail in the patents relating to CED baths cited earlier on, some of which are discussed in more detail hereinafter. Examples of component (B) are formaldehyde condensation resins (urea, melamine, benzoquanamine or phenol-formaldehyde resins), blocked polyisocyanates and/or resins containing transesterifiable ester groups with addition of standard catalysts. In order to utilize the non-yellowing properties of the aminopoly(meth)acrylate resin and to obtain ED baths having as high a pH value as possible, it is preferred to use blocked aliphatic or cycloaliphatic polyisocyanates or resins containing transesterifiable ester groups or mixtures thereof.

As in the prior art, from 50 to 5% by weight of crosslinking agent are used to 50 to 95% by weight of aminopoly(meth)acrylate resin, the products known from the prior art (cf. the literature references cited earlier on) being suitable for use as crosslinking agents. The CED baths may optionally contain up to 30% by weight of co-emulsified hydroxyfunctional resins (component C) which are reactive with the crosslinking agents (cf. for example EP-A-0 040 090).

Components (A) and (B) are preferably mixed in a ratio of from 90:10 to 60:40, the mixing ratio being empirically determined from the optimal performance properties attainable at the particular stoving temperature. In certain cases, it may be of advantage to use a combination of several cross-linking systems.

The crosslinking agent has an average molecular weight ($\overline{Mn}$) of from about 250 to 5000 and more especially from 500 to 3000. Optimal properties are obtained where from 5 to 95% by weight of blocked polyisocyanate is mixed with from 95 to 5% by weight of transesterifiable crosslinking agent, based on the sum of the crosslinking agents as solid resin. The blocked polyisocyanate and the transesterifiable cross-linking agent are preferably mixed in a ratio of from 1:4 to 4:1 and more preferably in a ratio of from 1:2 to 2:1.

The blocked polyisocyanates are prepared by reacting a multifunctional isocyanate with an at least stoichiometric quantity of a monofunctional compound containing active hydrogen (Zerewitinoff reaction), optionally in the presence of basic catalysts, such as tert.-amines or small quantities of tin salts, such as dibutyl tin dilaurate. The reaction product obtained reacts on heating with the hydroxy groups of the aminopoly(meth)acrylate resin, the protective group being split off again. Agents suitable for blocking the isocyanates contain a single amine, amide, lactam, thiol or hydroxyl group. Blocking agents which have proved to be effective are, for example, aliphatic or cycloaliphatic alcohols, such as 2-ethylhexanol; dialkylaminoalkanols, such as dimethylaminoethanol; phenols, such as cresol; oximes, such as methyletherketoxime; lactams, such as ε-caprolactam; imides, such as phthalimide; malonic acid or acetoacetic esters.

Typical multifunctional isocyanates which may be used in accordance with the invention are aliphatic, cycloaliphatic and/or aromatic polyisocyanates containing at least two isocyanate groups per molecule, such as for example the isomers or isomer mixtures of tolylene diisocyanate, tolylene triisocyanate, 4,4'-diphenylmethanediisocyanate, diphenyltetraisocyanate and/or naphthyltetraisocyanate, and hydrogenation products thereof, such as dicyclohexylmethanediisocyanate. Preferred aliphatic diisocyanates are compounds corresponding to the following formula

$$O=C=N+CR_2\rightarrow_r N=C=O$$

in which r is an integer of from 3 to 12, more especially from 6 to 8, and R may be the same or different and represents hydrogen or a lower alkyl radical containing from 1 to 8 C-atoms and preferably 1 or 2 C-atoms. Examples of aliphatic diisocyanates such as these are hexamethylene diisocyanate, 1,6-diisocyanato-2,2,4-trimethylhexane, isophorone diisocyanate. Vinyl polymers which, in addition to isocyanate groups, for example from cyanatoethyl(meth)acrylate, also contain alkyl(meth)acrylates and/or (alkyl)vinylbenzenes as co-monomers, may also be used.

Mixed aliphatic/aromatic compounds are also suitable. Products obtained by trimerization or oligomerization from diisocyanates or polyisocyanates and polyfunctional compounds containing OH or NH groups have proved to be useful as triisocyanates. Products such as these include, for example, the biuret of hexamethylenediisocyanate and water, the isocyanurate of hexamethylenediisocyanate or the adduct of tolylene diisocyanate with trimethylolpropane. Enlargement of the molecule may also be obtained by reaction with polyalcohols containing tertiary amino groups, such as N-methyldiethanolamine, triethanolamine, or with polyamines containing tertiary amino groups, such as 3-(methyl)-3-(2-aminoethyl)aminopropylamine. In order to improve solubility, chain-terminating N-dialkylaminoalcohols, such as dimethylaminoethanol, or N,N-dialkylalkylene diamines, such as dimethylaminopropylamine or N,N-diethyl-N'-methyl-1,3-ethane diamine, may be additionally used. Isocyanate-containing prepolymers based on polyglycolethers, polyester polyols, polyether polyols, polycaprolactone polyols and/or polycaprolactam polyols, may also be used with advantage. In order to produce non-yellowing one-coat lacquers, it is preferred to use aliphatic and cycloaliphatic polyisocyanates.

Another suitable type of crosslinking agent (component B) is a resin containing terminal or lateral esterified carboxyl groups which are stable in neutral, aqueous medium but which, in the basic medium of the deposited film, react with one or more aminopoly(meth)acrylates containing hydroxyl groups (component A) at temperatures above about 140° C. In this reaction, the transesterifiable ester groups transesterify with the hydroxyl groups of the aminopoly(meth)acrylate resin with elimination of the more volatile "alcoholic protective groups". Virtually all the terminal or lateral carboxyl groups should be esterified with alcohols which are volatile under the stoving conditions. To prevent migration of the polyester to the anode, it is important to ensure that the polyester has an acid number below 20, preferably below 10 and more preferably below 3.

The reactivity of the esters is increased by a suitable chemical constitution, for example by increasing the electrophilic acitivity of the carboxyl group or by a negative inductive effect on the alcohol group. Primary, secondary and tertiary carboxyl groups are capable of transesterification. Primary carboxyl groups are preferred by virtue of their higher reactivity. Transesterification is supported by the volatility of lower, linear or branched primary monalcohols or by 1,2-glycols optionally substituted by ether or ester groups. The lower the molecular weight of the alcohols which are split off during the transesterification, the lower the associated losses. Methanol or ethanol is particularly preferred. Numerous crosslinking agents containing ester groups which are used for transesterification with OH groups and/or for transamidation with $NH_2$ groups are described in the literature. For example, EP-A-0 040 090 describes polyurethane esters containing hydroxyalkylester groups, such as lactic acid esters, or aminoalkylester groups as transesterifiable groups. The crosslinking agent has substantially the following general structure:

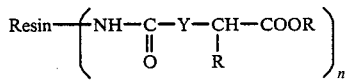

in which n has a value of at least 2 and preferably from 3 to 10, Y represents either —O— or —NH— and R is a linear or branched alkyl group containing from 1 to 8 C-atoms and preferably 1 or 2 C-atoms.

Another suitable crosslinking agent is a polyester containing carboxyl groups blocked by optionally substituted 1,2-glycols to form β-hydroxy compounds:

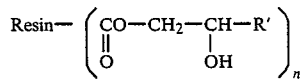

The 1,2-glycols used are best substituted by saturated or unsaturated alkyl, ether, ester or amide groups, i.e. R' represents

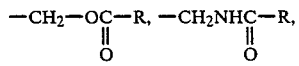

where n has a value of at least 2 and preferably from 3 to 10 and R is a linear or branched alkyl group containing from 1 to 15 C-atoms.

Crosslinking agents such as these are described in EP-A-0 012 463 and in DE-A-31 03 642, for example as the reaction product of trimellitic acid anhydride with Cardura E ®, the glycidyl ester of Versatic acid ®.

Other crosslinking agents are produced by transesterification of dicarboxylic acid alkylesters with polyalcohols. Resins corresponding to the following general formula have proved to be particularly reactive:

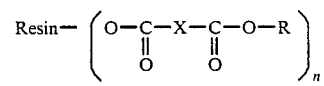

in which n has a value of at least 2 and preferably from 3 to 10, X represents a —$CH_2$—, —$CH_2$—$CH_2$— or —CH=CH— group and R is a linear or branched alkyl group containing from 1 to 8 and preferably 1 or 2 C-atoms. In its most simple form, this crosslinking agent is a reaction product of trimethylol propane and malonic acid dimethylester, as described in EP-A-0 082 291.

Other crosslinking agents capable of transesterification are obtained by Michael addition of acetoacetic acid alkylester or malonic acid dialkylester onto resins containing double bonds activated through CO-groups:

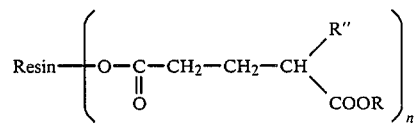

in which R" represents —COOR, —CO—R or —CN and n has a value of at least 2 and preferably of from 3 to 10. In the most simple case, these resins are produced from butane diol diacrylate and acetoacetic ester or from the tolylene diisocyanate-hydroxyalkyl(meth)acrylate adduct and malonic acid dialkylester, as described in DE-A-33 15 469. The Michael addition may be carried out stoichiometrically or even using excess double bonds.

DE-A-33 22 766 describes crosslinking agents containing carbalkoxymethylester groups. Crosslinking agents of this type correspond substantially to the following general formula:

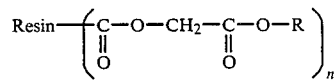

in which n has a value of at least 2 and R is an alkyl group.

The crosslinking of aminopoly(meth)acrylate resins containing OH groups with blocked polyisocyanates may optionally be accelerated by addition of from 0.1 to 2% by weight and more especially from 0.5 to 1% by weight, based on solid resin of components (A) and (B), of strongly basic tertiary amines and/or active metal compounds. A special, occasionally synergistic effect is obtained by a combination of the basic medium of the deposited aminopoly(meth)acrylate resin and the metal salts of bismuth, lead, cobalt, iron, antimony and/or tin(II) and (IV). Particularly preferred catalysts are iron(III) acetylacetonate, dibutyltindilurate, tri-n-butyltin oxide, dibutyltin dioctylmaleate, tin octoate, tin oleate, tetrabutyl titanate and/or cobalt-2-ethylhexanoate.

A relatively high catalyst content is generally necessary for catalyzing the transesterification reaction. It is best to use from 0.1 to 10% by weight and preferably from 2 to 6% by weight, based on components (A) and (B), of metal oxides, metal salts or metal complexes of monovalent or polyvalent metals. They are generally dissolved in aliphatic and aromatic hydrocarbons after salt formation with 2-ethylhexanoic acid or naphthenic acid. These solutions are incorporated in the electrophoresis bath by emulsification. Another possibility is to complex the metals with acetylacetonate, dicyclopentadiene, 8-oxyhydroquinoline, 4-methylcatechol and/or 2,5-dimercapto-1,3,4-thiadiazole.

Examples of suitable catalysts are antimony trioxide, cobalt napthenate, lead octoate, iron acetylacetonate, the reaction product of zinc oxide and 8-oxyhydroxyquinoline, thalliumdicyclopentadiene or triethanolaminetitanate. Lead octoate and zinc oxyhydroquinolate are preferred. The metal catalysts may also be co-dispersed in finely divided form as pigments, such as lead silicate. Water-dilutable metal salts are also suitable as transesterification catalysts where the metal is deposited with the lacquer in finely divided form as a compound or complex. Preferred catalysts are sparingly soluble in the ED bath and, after electrophoretic deposition, are uniformly dispersed throughout the deposited film during stoving.

Components (A) and (B) may be cold-mixed or even precondensed at elevated temperature. In this case, components (A) and (B) react with one another to a certain extent without the mixture leaving its thermosetting property or its ability to be solubilized in water by protonization with acids.

In order to balance out its performance properties, the cathodically depositable aminopoly(meth)acrylate resin best contains, in addition to the crosslinking agent, up to 30% by weight and preferably from 5 to 20% by weight of a hydroxyfunctional resin (component C) which reacts with the blocked polyisocyanates and the transesterifiable crosslinking agents. Thus, hydroxyfunctional resins having an OH number of from 30 to 500 and more especially from 50 to 300 and an average molecular weight ($\overline{M}n$) of from 300 to 5000 and more especially from 500 to 3000 may be used to increase coverage. Examples of resins such as these are styrene-allylalcohol copolymers, (meth)acrylic copolymers containing OH groups, caprolactone polyols, caprolactam polyols, urethane polyols, polyethers and polyesters containing OH groups. Thus, copolymers containing OH groups are prepared by copolymerization of unsaturated monomers containing hydroxyl groups with other ethylenically unsaturated monomers which do not contain any other reactive functional groups, as described above. Polyether polyols are understood to be compounds corresponding to the following general formula

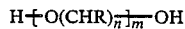

in which R=H or a lower alkyl group optionally containing various substituents, n=2 to 6 and m=5 to 50. Exxamples are polyoxytetramethylene glycols. Polyester polyols may be obtained by polycondensation of polycarboxylic acids or their anhydrides with organic polyalcohols or by reaction of an ε-lactone with polyalcohols. The polycarboxylic acids are normally aliphatic, cycloaliphatic or aromatic dicarboxylic acids whilst the polyalcohols are normally linear or branched aliphatic or cycloaliphatic polyols. Examples are branched polyesters of adipic acid, phthalic acid anhydride, trimethylol propane and 1,3-butylene glycol or the reaction product of ε-caprolactone with trimethylol propane. Polyurethane polyols are obtained by reaction of aliphatic cycloaliphatic or aromatic polyisocyanates, preferably diisocyanates, with aliphatic or cycloliphatic polyalcohols, polyether polyols and/or polyester polyols. The various hydroxyfunctional resins may also be used as mixtures or may have a segmented structure. Examples of hydroxyfunctional resins such as these are the reaction products of 2 moles of polyglycolether with 1 mole of polyester containing hydroxyl groups or of 2 moles of polyglycolether with 2 moles of dicarboxylic acid and 1 mole of polyurethane containing hydroxyl groups.

The resins contain such a quantity of polar groups, preferably primary OH groups, that they may be satisfactorily emulsified in the neutralized, basic aminopoly(meth)acrylate resin (component A). To achieve better compatibility and dilutability with water, it is possible to incorporate a low amine number below 30 and preferably below 20. The resins are preferably synthesized in such a way that the components do not yellow on stoving. The molecular weight range is so selected that they are no longer volatile, but instead acquire good film-forming properties through improved fluidity. Any precondensation step may be carried out in any order, i.e. component (A) with (B) or component (B) with component (C) or component (A) with component (B) and (C).

By protonization with acids, the cationic aminopoly(meth)acrylate resin is made dilutable with water in known manner. Examples of acids suitable for this purpose are formic acid, acetic acid, propionic acid, lactic acid, citric acid, malonic acid, acrylic acid, phosphoric acid or alkylphosphoric acid. Monobasic, low molecular weight organic carboxylic acids are preferred. The acid must be added in at least such a quantity that the cationic base resin is stably emulsified. An excess of acid, i.e. a degree of neutralization above 100%, should best be avoided. The MEQ value (milliequivalents of acid per 100 g of solid resin) is generally between 20 and 80. It is desirable to have as low an MEQ value as possible to obtain as high a deposition equivalent as possible.

The coating composition may additionally contain standard lacquer additives, such as anticrater agents, levelling agents, antifoam agents, etc. It is of course important to select additives of the type which do not enter into troublesome reactions with water at an acidic to neutral pH value, which do not entrain any troublesome foreign ions and which, in the event of prolonged standing, do not precipitate in non-stirrable form, i.e. the coating composition must be able to be converted into a useful dispersion by stirring, even after prolonged standing.

To reduce viscosity, to control the deposition voltage and to improve adhesion and levelling, the coating composition may contain up to approximately 20% by weight of organic solvents. The organic solvent content should be as low as possible, preferably below 15% by weight and more preferably below 10% by weight. Suitable solvents are alcohols, glycolethers, ketoalcohols, optionally with addition of aliphatic and/or aromatic hydrocarbons of varying chain length. In selecting the solvent, it is important to bear in mind that the crosslinking agent is not soluble in water and that fractions of water-insoluble solvents may facilitate and stabilize the dispersion process. Coverage deteriorates and the thickness of the layer deposited increases with increasing solvent content and overcoating can occur. Water-insoluble solvents have a stronger effect in this direction than water-soluble solvents. The aprotic solvents which may be necessary for the preparation of the resins may optionally be distilled off and replaced by other solvents after preparation of the product.

After dilution with water, the coating composition according to the invention best has a solids content of from 5 to 50% by weight. Where the lacquer is adjusted to a higher solids content of from 25 to 50% by weight and preferably from 30 to 45% by weight, the water-dilutable stoving lacquers obtained may be applied to the object to be lacquered by immersion coating, spray coating, roll coating, etc. If, by contrast, the lacquer is diluted to a solids content of from 5 to 30% by weight and preferably from 10 to 20% by weight, it is suitable for electrophoretic deposition. The bath is continuously stirred to maintain a uniform temperature at the cathode surface and to prevent the insoluble constituents of the dispersion, for example the pigments, from settling. The pH-value of the lacquer is generally between 4.0 and 7.5 and preferably between 5.0 and 6.5. If the pH-value is too low, the acid is likely to attack the iron in tanks, pipes and pumps. The electrophoretic deposition is best carried out at the earliest 24 hours after preparation of the bath. In the meantime, the bath is best continuously stirred to ensure uniform distribution. Electrically conductive, non-corroding electrodes, for example of stainless steel or graphite, are used as the anode. The object to be coated at the anode and the anode are immersed in an aqueous bath, as known for electrophoretic deposition. Any metallically conductive workpieces may be coated, including copper, aluminium, tin, zinc, iron and alloys thereof. During deposition, the bath is kept at temperatures of best from about 15° to 35° C. The solids content, the deposition temperature and time and the voltage are so selected that the desired layer thickness is obtained after rinsing with water and/or ultrafiltrate and stoving at temperatures of from about 150° to 230° C. For example, layer thickness increases with increasing coating time and deposition voltage. If an electrical current with a voltage of best from 50 to 500 volts is applied between the metallically conductive workpiece and a counterelectrode, the water-dilutable base resin is coagulated at the cathode, taking with it the water-insoluble crosslinking agent, pigments, catalysts, etc. The ratio of pigment to synthetic resin binder in the deposited film may shift in favor of the pigment. At the same time, water and the acid used for neutralization are concentrated in the bath. Accordingly, the bath has to be topped up with concentrated lacquers which correct this shift through modified quantitative ratios. This correction may also be made by employing suitable equipment, for example electrode dialysis or ultrafiltration.

The concentrated water-dilutable binder according to the invention, for example having a solids content of around 85 to 60% by weight, may be pigmented in the usual way in a ball mill, on a three-roll stand or in a bead mill. Standard pigments, fillers, corrosion inhibitors and lacquer auxiliaries may be used for this purpose providing they do not enter into any troublesome reactions with water in the acidic to neutral medium, do not entrain any water-soluble foreign ions and are not precipitated on ageing to such an extent that they cannot be stirred up again. The lacquers are particularly suitable for the electrodeposition of metals and, after stoving at 160° to 190° C., preferably for 15 to 45 minutes, give smooth, glossy, non-yellowing films characterized by good ageing stability, adhesion, hardness and elasticity and also corrosion resistance. The pigment-to-binder ratio depends upon the dispersibility and viscosity of the binder and is generally from 0.1:1 to 1.5:1. Preferred pigments and hence ED baths containing them are those which establish the final color of the coated object and, hence, its final lacquering. The invention is particularly advantageous for light, particularly white, pigments, such as titanium dioxide, because the deposited lacquer undergoes hardly any change in color during stoving and, accordingly, may be used as a weathering-resistant one-coat lacquer. Accordingly, it is possible by small additions of colored pigments to the titanium dioxide to establish optionally metallic pastel shades which keep their color. If the lacquer is used as a primer for a two-coat system, an advantage arises out of the fact that the surface lacquer may be stoved at higher temperatures, such as 10° to 60° C. and preferably 20° to 40° C. higher, than the undercoat or primer without the color of the surface lacquer being affected in any way by the primer.

COMPARISON EXAMPLE 1

According to EP-A-0 082 291, Example A 4

30 g of azo-bis-isobutyronitrile are dissolved in 600 g of isopropanol with heating to 50° C. A monomer mixture consisting of 300 g of glycidylmethacrylate (2.027 moles), 300 g of hydroxyethylmethacrylate, 300 g of methylmethacrylate and 600 g of ethylhexylacrylate in which 30 g of azo-bis-isobutyronitrile are dissolved is uniformly added to the clear solution over a period of 2 hours at reflux temperature (rising from 82° to 86° C.). After stirring for another 3 hours at reflux temperature (approx. 90° C.), a homogeneous solution of 240 g of diisopropanolamine (1.805 moles) in 300 g of ethylene glycol monobutylether is quickly added, followed by stirring for another 2 hours at 90° C. Dilution with 225 g of ethylene glycol monobutylether.

| Solids content | 63% by weight (after heating for 30 minutes at 150° C.) |
|---|---|
| Amine number | 55 mg KOH/g solid resin |
| Viscosity | 3.7 Pas (after dilution with ethylene glycol monobutylether to 60% by weight at 25° C.) |

The resin underwent an increase in viscosity on ageing
to 4.1 Pas after 1 week
to 5.4 Pas after 4 weeks.
Preparation of a deposition bath formulated as follows:
476 g of comparison resin 1
107 g of crosslinking agent B 1
7 g of Octa-Soligen ® lead (72%)
8.3 g of formic acid (85%)
are successively stirred together and slowly diluted to 2 liters with fully deionized water.

| Solids content | 14.5% by weight (30 mins. at 180° C.) |
|---|---|
| pH-value | 5.5 |
| Bath conductivity | 1603 $\mu Scm^{-10}$ |
| MEQ value | 42 |

The film coagulates so loosely at 75 volts that it is partly detached from the plate on rinsing with water. Accordingly, coating is not possible. Component A 4 is not mentioned in any deposition example in EP 82 291.

COMPARISON EXAMPLE 2

The procedure is the same as in Example 1 using the following quantities:

```
26.0 g of azo-bis-isobutyronitrile
520 g of isopropanol
260 g of glycidylmethacrylate (1.757 moles)
260 g of hydroxyethylmethacrylate
260 g of methylmethacrylate
520 g of ethylhexylacrylate
 26 g of azo-bis-isobutyronitrile
116.7 g of monomethylethanolamine (1.556 moles)
260 g of ethylene glycol monobutylether
195 g of ethylene glycol monobutylether
```

The batch gels after addition of the relatively strongly basic amine.

When the monomethylethanolamine is replaced by an equivalent quantity of diethylamine (113.6 g), the batch again gels.

COMPARISON EXAMPLE 3

According to DE-A-23 25 177, Example 4

640 g of isopropanol and 32 g of azo-bis-isobutyronitrile are introduced into and heated in a reactor equipped with a stirrer, reflux condenser, dropping funnel and thermometer. After commencement of the reflux, a mixture of 480 g of glycidylmethacrylate (3.24 moles), 320 g of styrene, 160 g of methylmethacrylate, 640 g of ethylacrylate and 32 g of azo-bis-isobutyronitrile is uniformly added over a period of 2 hours, followed by heating under reflux (approx. 85° C.) for 3 hours. This copolymer solution has a solids content of 72.8% by weight (after heating for 30 minutes to 150° C.) and a viscosity of 746 mPas (after dilution to 60% by weight with isopropanol at 25° C.). A solution of 62.4 g of monomethylethanolamine (0.83 mole) in 128 g of isopropanol is then quickly added. The batch gels on heating to reflux temperature.

Aminopoly(meth)acrylate resin A1

In a 4-liter face-ground flask equipped with stirrer, thermometer and reflux condenser, 938 g of ethylene glycol monobutylether are heated to 115° C. under an inert gas. A mixture of 268 g of hydroxyethylacrylate, 306 g of glycidylmethacrylate, 952 g of n-butylacrylate, 341 g of n-butylmethacrylate and 21.6 g of tert.-butylperoxy-2-ethylhexoate is then added over a period of 3 hours at the temperature of 115° C. After stirring for 1 hour, 6.6 g and, after another hour, 4.5 g of tert.-butylperoxy-2-ethylhexoate are added to complete the reaction.

After another 3 hours at 115° C., the solution is cooled and is found to have a viscosity of 500 mPas (measured after dilution to 60% by weight with ethylene glycol monobutylether at 25° C.) for a solids content of 67.5% by weight (after heating for 30 minutes to 150° C.). The solution has an epoxy equivalent weight of 1400. After cooling to 30° C., a cold mixture of 108 g of isopropanol and 168 g of monomethylethanolamine is added all at once (1.04 mole of amine to 1.00 mole of epoxide). The temperature is prevented from rising beyond 40° C. by cooling. After the exothermic reaction has abated, the product is heated to 60° C. and kept at that temperature for 3 hours. The excess amine is then distilled off with steam at around 100° C.

| Final values | |
|---|---|
| Solids content | 76.2% by weight (30 mins at 150° C.) |
| Viscosity | 3.2 Pas (60% in ethylene glycol monobutylether) |
| Amine number | 54 mg KOH/g solid resin |
| Hydroxyl number (calculated) | 178 mg KOH/g solid resin |

No significant increase in viscosity was observed after storage of the batch for 2 months.

Aminopoly(meth)acrylate resin A2

725 g of ethylene glycol monobutylether are heated under an inert gas to 110° C. using a reflux condenser. A mixture of 192 g of hydroxyethylacrylate, 137 g of butane diol monoacrylate, 228 g of glycidylmethacrylate, 364 g of 2-ethylhexylacrylate, 439 g of butylmethacrylate, 438 g of methylmethacrylate, 90 g of styrene and 44 g of azo-bis-isobutyronitrile is then added over a period of 3 hours. After 1 hour at 110° C., 6 g of azo-bis-isobutyronitrile are added and the same procedure repeated after another hour. After 3 hours at 110° C., a solids content of 72.2% by weight and, after dilution to 60% by weight with ethylene glycol monobutylether, a viscosity of 2.14 Pas at 25° C. are measured. After cooling to 50° C., a mixture of 129 g of diethylamine and 201 g of isopropanol (1.10 mole of amine to 1.00 mole of epoxide) is quickly added. After 30 minutes, the product is heated to 65° C. and kept at that temperature for 1 hour and then heated to 105° C. and kept at that temperature for 2 hours. After cooling to 80° C., isopropanol and excess amine are distilled off in vacuo, after which residues of amine are removed by distillation with steam. The solids content is adjusted to 78% by weight with ethylene glycol monobutylether.

| Final values | |
|---|---|
| Solids content | 78.7% by weight (30 mins at 150° C.) |
| Amine number | 45 mg KOH/g solid resin |
| Viscosity | 3.44 Pas (after dilution to 60% by weight with ethylene glycol monobutylether). |

The resin does not increase in viscosity in storage and, after combination with crosslinking agents (cf. Examples 2 and 3), gives smooth surfaces characterized by a uniform distribution of layer thickness.

Crosslinking agent B1 (polyester)

In accordance with EP 12 463, page 17, Example II(a), 781 g of trimellitic acid anhydride are dissolved at 100° C. in 1976 g of ethylene glycol monobutylether and the resulting solution mixed with 2236 g of Cardura E 10 ®, the glycidylester of Versatic acid ®, and with 7 g of benzyldimethylamine. The mixture is heated with stirring to 120° C. and kept at that temperature until the acid number has fallen below 1.1 mg KOH/g. The polyester has the following values:

| | |
|---|---|
| Solids content | 70.7% by weight (60 mins. at 125° C.) |
| Acid number | 0.7 mg KOH/g solid resin |
| Epoxy equivalent | |

| weight | >10,000 |
|---|---|

Crosslinking agent B2 (blocked polyisocyanate)

1944 g of tris-(isocyanatohexyl)-biuret (=Desmodur N-100 ®) are introduced under an inert gas into a reaction flask and heated with slow stirring to 80° C. 1256 g of ε-caprolactam are uniformly added over a period of 3 hours in such a way that the reaction temperature does not exceed 100° C. 0.4 g of dibutyl tin dilaurate is then added, after which the reaction mixture is left to fall to 80° C. The reaction mixture is kept at that temperature until its isocyanate content has fallen below 0.3%. Dilution with ethylene glycol monobutylether to a solids content of 65% by weight.

Crosslinking agent B3 (blocked polyisocyanate)

666 g of isophorone diisocyanate and 134 g of trimethylol propane are mixed with 431 g of ethylglycolacetate and heated with stirring for 1 hour to 60° C. in the absence of moisture. The initially insoluble and solid trimethylol propane melts and reacts slowly over a period of another hour, during which the temperature is increased to 90° C. The reaction mixture is left at 90° C. for another 3 hours to complete the reaction, an NCO equivalent weight of 410 being obtained. 366 g of ε-caprolactam are then added over a period of 3 hours so slowly that the reaction temperature does not exceed 100° C. The reaction mixture is then kept at that temperature until the NCO content has fallen below 0.1%. The solvent is then largely distilled off in vacuo, followed by dilution with ethylene glycol monobutylether to a solids content of 80% by weight.

Hydroxyl-containing polymer resin C1

A mixture of 636 g of n-butylacrylate, 344 g of hydroxyethylacrylate and 10 g of azo-bis-isobutyronitrile is added dropwise over a period of 3 hours at around 100° C. to 667 g of secondary butanol, after which polymerization is completed over a period of 4 hours with addition of 2×3 ml of tert.-butylperoctoate.

| Solids content | 59.2% by weight, measured by heating for 40 minutes to 180° C. in a recirculating-air oven. |
|---|---|

Hydroxyl-containing polymer resin C2

1050 g of ethylene glycol monobutylether are heated to 80° C. and 1950 g of a commercially available allylalcoholstyrene copolymer having an averge molecular weight of 2400 and an OH-equivalent weight of around 300 are dissolved therein.

| Solids content | 65.1% by weight (40 mins at 180° C.). |
|---|---|

EXAMPLE 1

315 g of the aminopoly(meth)acrylate resin A1 are mixed with 80 g of crosslinking agent B1, 6.0 g of polymer resin C1, 5.8 g of Octa-Soligen ® lead (72%) and 4.95 g of formic acid (85%) and the resulting mixture slowly diluted with stirring to 2 liters using deionizeed water.

| Solids content | approx. 15% by weight |
|---|---|
| pH-value | 6.1 |
| Bath conductivity | 1476 μScm$^{-1}$ |
| MEQ value | approx. 30. |

At a bath temperature of 25° C., a film was deposited onto zinc-phosphated sheets (Bonder 132) for 2 minutes at 120 volts. Stoving for 25 minutes at 180° C. produced a 16 to 17 μm thick dry film which was unaffected by methylethylketone and did not yellow. Films deposited from aged baths were no different in quality from films from deposited from fresh baths and showed a uniform surface.

EXAMPLE 2

196.8 g of aminopolyl(meth)acrylate resin A2, 106.5 g of a rutile pigment produced by the chloride process and after-treated with aluminium, 12 g of polymer resin C2, 0.86 g of di-n-butyl tin dilaurate and 65 g of ethylene glycol monoethylether are ground in a bead mill for 35 minutes at temperatures below 55° C. 59.6 g of crosslinking agent B2 are then added and mixed in a dissolver, 10.5 g of formic acid (50%) being gradually added. Using fully deionized water, dilute carefully to 2 liters with thorough stirring.

| pH-value | 5.3 |
|---|---|
| Bath conductivity | 1510 μScm$^{-1}$ |
| MEQ value | 38 |
| Solids content | 15.1% by weight. |

Zinc-phosphated steel sheets (Bonder 132) are coated for 2 minutes at 220 volts at a bath temperature of 28° C. After rinsing with water and stoving for 25 minutes at 180° C., a dry film thickness of 17 to 18 μm is obtained. A smooth, white film is formed and shows a satisfactory surface, high resistance to corrosion and high resistance to detergents and does not yellow in the event of overstoving (30 minutes at 200° C). Even after standing for several weeks, the bath still produces a film having the same surface quality.

EXAMPLE 3

The bath is prepared in the same way as in Example 2 using the following quantities:

| 196.8 g of aminopoly(meth)acrylate resin A2 |
|---|
| 106.5 g of rutile pigment |
| 10.9 g of Octa-Soligen ® lead (72%) |
| 48.4 g of crosslinking agent B1 |
| 66.1 g of ethylene glycol monoethylether |
| 10.5 g of formic acid (50%). |

The bath has the following values:

| pH-value | 5.2 |
|---|---|
| Bath conductivity | 1630 μScm$^{-1}$ |
| MEQ value | 42 |
| Solids content | 14.7% by weight |
| Coating conditions | |
| Bath temperature | 28° C. |
| Coating time | 2 minutes |
| Deposition voltage | 210 volts |

-continued

| | |
|---|---|
| Dry film thickness | 17 to 18 μm. |

A smooth white film having a satisfactory surface and good coverage is formed and does not yellow in the event of overstoving (30 minutes at 200° C.). After standing for several weeks, the bath still produces a film having the same surface quality.

EXAMPLE 4

The bath is prepared in the same way as in Example 2 using the following quantities:

| | |
|---|---|
| 206.5 g of aminopoly(meth)acrylate resin A2 | |
| 106.4 g of rutile pigment | |
| 6.4 g of Octa-Soligen ® lead (72%) | |
| 0.4 g of dibutyl tin dilaurate | |
| 54.8 g of ethylene glycol monobutylether | |
| 24.2 g of crosslinking agent B1 | |
| 29.8 g of crosslinking agent B3 | |
| 10.5 g of formic acid (50%). | |

The bath has the following values:

| | |
|---|---|
| pH-value | 5.2 |
| Bath conductivity | 1730 μScm$^{-1}$ |
| MEQ value | 51 |
| Solids content | 14.2% by weight |
| Coating conditions | |
| Bath temperature | 28° C. |
| Coating time | 2 minutes |
| Deposition voltage | 150 volts |
| Dry film thickness | 17 μm. |

An ageing-resistant, smooth white film having a satisfactory surface is formed and does not yellow in the event of overstoving.

We claim:

1. A cathodically depositable aqueous electrodeposition lacquer coating composition (CED bath) which contains a synthetic resin binder containing amino groups, which may be solubilized in water by protonization by acids, and comprising an externally crosslinkable aminopoly(meth)acrylate resin free from epoxy groups for water-dilutable lacquers having an amine number of from 30 to 150 and a hydroxyl number of from 30 to 450 said composition further contains, from 50 to 5% by weight of a crosslinking agent of a blocked isocyanate and/or a resin containing a transesterifiable ester group, and up to a maximum of 30% by weight of a hydroxyfunctional resin which is reactive with the blocked isocyanates and the transesterifiable esters of said crosslinking agent; said externally crosslinkable aminopoly(meth)acrylate resin being obtained by reacting poly(meth)acrylate resin containing epoxy groups and having an average molecular weight (Mn) of from 600 to 10,000 and an epoxy equivalent weight of from 300 to 4,000 with an excess of primary and/or secondary monoamines and/or aminoalcohols to react the free epoxy groups with the amine groups, and distilling off the unreacted excess amine compounds.

2. The aqueous electrodeposition lacquer coating composition of claim 1 in which said binder further comprises hydroxy-functional resins.

3. The aqueous electrodeposition lacquer coating composition of claim 1 further comprising pigments, fillers, corrosion inhibitors, lacquer auxiliaries, catalysts and, in a quantity of up to 20% by weight, based on the total weight of the coating composition, organic solvents.

* * * * *